United States Patent [19]

Gardikes et al.

[11] 4,127,157
[45] Nov. 28, 1978

[54] ALUMINUM PHOSPHATE BINDER COMPOSITION CURED WITH AMMONIA AND AMINES

[75] Inventors: John J. Gardikes; Richard H. Toeniskoetter, both of Worthington, Ohio

[73] Assignee: Ashland Oil, Inc., Ashland, Ky.

[21] Appl. No.: 775,013

[22] Filed: Mar. 7, 1977

[51] Int. Cl.$^2$ ............................ B22C 1/10; B22C 1/18
[52] U.S. Cl. ........................................ 164/12; 106/38.3; 106/38.35; 106/38.9; 164/113; 164/16; 164/41
[58] Field of Search ............... 106/38.3, 38.35, 38.9, 106/85, 286; 164/16, 41, 12, 113

[56] References Cited

U.S. PATENT DOCUMENTS

| 3,316,110 | 4/1967 | Herbst et al. ........................... 106/65 |
| 3,329,516 | 7/1967 | Chuatal .................................. 106/66 |
| 3,923,525 | 2/1975 | Toeniskoetter et al. ............ 106/38.3 |
| 3,930,872 | 1/1976 | Toeniskoetter et al. ............ 106/38.3 |
| 3,968,828 | 7/1976 | Toeniskoetter et al. .............. 164/41 |

FOREIGN PATENT DOCUMENTS

| 577,533 | 6/1959 | Canada ..................................... 164/16 |
| 25,292 | 7/1973 | Japan ........................................ 164/16 |
| 812,352 | 4/1959 | United Kingdom. |

*Primary Examiner*—Francis S. Husar
*Assistant Examiner*—Gus T. Hampilos
*Attorney, Agent, or Firm*—Van D. Harrison, Jr.

[57] ABSTRACT

Disclosed are foundry binder compositions comprising boronated aluminum phosphate and water, cured by contacting them with gaseous ammonia or an amine. Optionally the composition may also include alkaline earth metals and oxides, and solid polyhydric alcohols or solid organic carboxylic acids.

34 Claims; No Drawings

ALUMINUM PHOSPHATE BINDER COMPOSITION CURED WITH AMMONIA AND AMINES

BACKGROUND OF THE INVENTION

The present invention relates to binder compositions and methods for curing such binder compositions. The binder compositions of the present invention are especially useful as molding compositions for refractories and abrasive articles, and for molding shapes such as foundry cores and molds. The binder compositions are capable of hardening at ambient temperatures.

Various binder systems now used, including binders for molding compositions employ inorganic substances as the major components.

The inorganic binder systems have generally been limited to the so-called "no-bake processes" where the binder, curing agent and aggregate are mixed and packed in a core box. Over a period of time the packed mixture hardens sufficiently so that it can be removed from the mold and allowed to harden further. Inorganic binder systems of this nature have a limited bench life since the curing agent begins to function immediately upon mixing. Although inorganic binder systems are available for use in the "cold-box process", such binder systems have met with only limited success. Cores made with silicate carbon dioxide systems usually exhibit low strengths and poor shake-out properties. The term "cold-box process" refers to the method of making foudnry cores, molds, etc., whenever a mixture of aggregate and binder are compacted into a core box and then contacted with a gaseous curing agent. Systems using organic binders such as benzylic ether resins, cured with gaseous amines are discribed in U.S. Pat. No. 3,404,579. A cold-box process system with improved shake-out in which inorganic binders mixed with aggregate are cured with a gaseous curing agent is highly desirable, particularly because less quantities of noxious gas would be liberated during the metal casting process.

A primary object of this invention is to provide inorganic binder systems which can be rapidly cured at room temperature by contact with a gaseous curing agent.

Another object of this invention is to provide inorganic binder systems having an extended bench life.

Still another object of this invention is to provide an inorganic binder system useful in "cold-box" core making processes.

Still another object of this invention is to provide an inorganic binder system having good removal or "shake-out" of the moulding shape from the metal casting.

SUMMARY OF THE INVENTION

The present invention is concerned with binder compositions which comprise:
(a) boronated aluminum phosphate containing a mole ratio of phosphorous to aluminum of about 2:1 to about 5:1 and boron in an amount from about 3 to about 40 mole percent of boron based on the moles of aluminum;
(b) water; and
(c) a curing agent comprising ammonia or an amine.

The amount of boronated aluminum phosphate is from about 50 to about 95 percent by weight based upon the total weight of aluminum phosphate and water, and correspondingly the amount of water is from about 5 to about 50 percent by weight based upon the total weight of the boronated aluminum phosphate and water.

The term "boronated aluminum phosphate" used throughout this description is a shortened term for "boronated hydrogen aluminum phosphate". The two terms are intended to be equivalent.

The above binder compositions can be modified with a solid organic carboxylic acid or preferably a solid polyhydric alcohol. Of the polyhydric alcohols, sorbitol is preferred. The above binder compositions can also be modified with metal phosphates such as those of iron, chromium and magnesium.

The present invention is also concerned with compositions for the fabrication of molded articles such as refractories, abrasive articles such as grinding wheels, and shapes used for molding which comprise:
(a) a major amount of aggregate;
(b) an effective bonding amount up to about 40 percent by weight of the aggregate of the binder composition defined above.

The present invention is further concerned with a foundry process which comprises mixing foundry aggregate with a bonding amount of up to about 10% by weight based upon the weight of the aggregate of the above-defined binder composition to thereby form a foundry mix. The invention is also concerned with foundry cores and molds made from this foundry mix.

The present invention is still further concerned with a process for casting relatively low melting point nonferrous type metal which comprises fabricating a shape from a composition which contains a major amount of aggregate and an effective bonding amount up to about 40% by weight of the aggregate of the binder composition defined above; pouring the relatively low melting point non-ferrous type metal while in the liquid state into the shape; allowing the non-ferrous type metal to cool and solidify.

DESCRIPTION OF PREFERRED EMBODIMENTS

The boronated aluminum phosphate constituent of the binder composition of the present invention is an aluminum phosphate which contains boron in an amount from about 3 to about 40 mole percent of boron based upon the moles of aluminum. The preferred quantity of boron is between about 5 and about 30 mole percent while the most preferred quantity is between about 10 and about 25 mole percent based upon the moles of aluminum.

Also, the aluminum phosphate contains a mole ratio of phosphorus to total moles of aluminum and boron of about 2:1 to about 5:1 and preferably from about 2.4:1 to about 3.5:1 and more preferably from about 2.8:1 to about 3.2:1.

The boronated aluminum phosphate is generally prepared by the reaction of an aluminum oxide-containing reactant, a source of phosphoric acid and a source of boron. It is preferred to employ a method of production wherein the aluminum oxide-containing reactant is completely dissolved. Also the boronated phosphate is preferably prepared from either $P_2O_5$ or concentrated phosphoric acid of from about 70 to about 85% by weight $H_3PO_4$ concentration. The preferred concentrated phosphoric acid solution contains about 86% by weight of $H_3PO_4$. Of course, other sources of phosphorus such as polyphosphoric acids, can be employed if desired.

Usually the boronated aluminum phosphates are prepared from boric acid and/or boric oxide and/or metallic borates such as alkali metal borates which include sodium borate ($Na_2B_4O_7 \cdot 10H_2O$). It is preferred to use boric acid rather than boric oxide since the acid is in a more usable form than the oxide because of its greater solubility in the reaction system as compared to the oxide. The boronated aluminum phosphates are preferably, but not necessarily, prepared by reacting together the phosphoric acid or $P_2O_5$; and alumina such as alumina trihydrate ($Al_2O_3 \cdot 3H_2O$); and boric acid or boric oxide.

Since the reaction is exothermic, it can generally proceed by merely admixing the reactants and permitting the exotherm to raise the temperature of the reaction mass until the exotherm peaks usually at about 200° F. to 250° F. After the exotherm peaks, it may be advantageous to apply external heat for about ½ to 2 hours to maintain a maximum reaction temperature between about 220° and about 250° F. to ensure completion of the reaction. Also, in some instances, it may be desirable to initiate the reaction by applying external heat just until the exotherm begins.

The reaction is generally carried out at atmospheric pressure. However, higher or lower pressures can be employed, if desired. In addition, the reaction is usually completed within about 1 to about 4 hours and more usually from about 2 to about 3 hours.

The amount of boronated aluminum phosphate employed in the binder system is from about 50 to about 95% by weight and preferably from about 65 to about 95% by weight based upon the total weight of boronated aluminum phosphate and water.

An alkaline earth material containing an alkaline earth metal in the form of its simple or compound oxide or hydroxide can be included in the boronated aluminum phosphate-water mixture. Alkaline earth materials suitable for inclusion are those described in U.S. Pat. No. 3,923,525 which is hereby incorporated by reference. Generally these alkaline earth materials can be added in amounts of up to 30 parts by weight per 100 parts of boronated aluminum phosphate. Depending upon the reactivity of the particular alkaline earth selected, the inclusion of too much of the alkaline earth metal material can have the adverse effect of shortening bench life. Included among the suitable alkaline earth metal materials are calcium oxides, magnesium oxides, calcium silicates, calcium aliminates, calcium aluminum silicates, magnesium silicates, and magnesium aluminates. Also included among the suitable materials of the present invention are the zirconates, borates, and titanates of the alkaline earth metals.

If alkaline earth material is to be added to the boronated aluminum phosphate-water solution, such addition should be reserved until just prior to use. The alkaline earth metal material can be added in the form of a dispersion or suspension in a liquid medium to facilitate material handling. Suitable liquids include alcohols such as ethylene glycol, furfuryl alcohol, esters such as cellosolve. acetate, and hydrocarbons such as kerosene, mineral spirits (odorless), mineral spirits regular, and 140 Solvent, available from Ashland Oil, Inc., and Shellflex 131 from Shell Oil, and aromatic hydrocarbons commercially available under the trade designations Hi-Sol 4-2 and Hi-Sol 10 Ashland Oil, Inc. Of course, mixtures of different diluents and suspending agents can be employed, if desired. Generally the alkaline earth metal material and diluent are mixed in a weight ratio of from about 1:3 to about 3:1 and preferably from about 1:2 to about 2:1.

The other necessary component of the binder system employed in the present invention is water. All or a portion of the water can be supplied to the system as the carrier for the boronated aluminum phosphate material. Also, the water can be introduced as a separate ingredient. Of course, the desired quantity of water can be incorporated in part as the water in the boronated aluminum phosphate and in part from another source. The amount of water employed is from about 15 to about 50% by weight and preferably from about 20 to about 40% by weight based upon the total weight of the boronated aluminum phosphate and water.

The boronated aluminum phosphate and water, if admixed, generally have a viscosity between about 100 and 2000 centipoises and preferably between about 200 and 1000 centipoises.

The presence of the boron provides aluminum phosphate water solutions which exhibit greatly increased shelf stability as compared to aluminum phosphate materials which do not contain boron. The enhanced shelf stability becomes quite significant when employing quantities of boron of at least about 5 mole percent based upon the moles of aluminum.

Although binder compositions comprising boronated aluminum phosphate, water and a curing agent comprising ammonia or a amine work well, there can also be added a solid polyhydric alcohol (or its keto tautomer) or a solid organic carboxylic acid. Of these two, the solid polyhydric alcohols are the most preferred.

If solid polyhydric alcohol is used it must be soluble in aqueous solutions of aluminum phosphate, and contain at least two adjacent carbon atoms each having directly attached thereto one hydroxyl group. The amount of the polyhydric alcohol and/or keto tautomer thereof included in the composition is from about 0.5 to about 25 percent by weight based on the total weight of boronated aluminum phosphate and polyhydric alcohol and/or keto tautomer.

The polyhydric alcohols employed according to the present invention are solid at ambient temperature and are soluble in aqueous solutions of the boronated aluminum phosphate. In addition, the polyhydric alcohols contain at least two adjacent carbon atoms each having directly attached thereto a hydroxy group, or are the keto tautomers thereof. The polyhydric alcohols usually contain from about 2 to about 20 hydroxyl groups preferably from about 2 to about 10 hydroxyl groups in the molecule. In addition, these substances employed according to the present invention generally contain 2 to about 20 carbon atoms and preferably from about 2 to about 10 carbon atoms. In addition, the polyhydric alcohols can contain other groups or atoms which do not adversely affect the function of the material in the composition of the present invention to an undesirable extent. For instance, many of the polyhydric alcohols employed in the present invention contain ether and/or carboxyl moieties. Also, the polyhydric alcohols are usually non-polymeric. Examples of some polyhydric alcohols include sorbitol, sucrose, invert sugar, D-glucose, B-glucose, dihydroxy succinic acid (tartaric acid), gluconic acid 1,2,6-hexanetriol. The preferred polyhydric alcohols are sorbitol and dihydroxy succinic acid.

The amount of polyhydric alcohol employed in the present invention is usually from about 0.5 to about 25% by weight and preferably from about 2 to about 15% by weight based upon the total weight of the aluminum phosphate and alcohol.

When preparing an ordinary sand type foundry shape, the aggregate employed has a particle size large enough to provide sufficient porosity in the foundry shape to permit escape of volatiles from the shape during the casting operation. The term "ordinary sand type foundry shapes" as used herein refers to foundry shapes which have sufficient porosity to permit escape of volatiles from it during the casting operation. Generally, at least about 80% and preferably about 90% by weight of aggregate employed for foundry shapes has an average particle size no smaller than about 150 mesh (Tyler Screen Mesh). The aggregate for foundry shapes preferably has an average particle size between about 50 and about 150 mesh (Tyler Screen Mesh). The preferred aggregate employed for ordinary foundry shapes is silica wherein at least about 70 weight percent and preferably at least about 85 weight percent of the sand is silica. Other suitable aggregate materials include zircon, olivine, alumino-silicate sand, chromite sand and the like.

When preparing a shape for precision casting, the predominate portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 325 mesh and 200 mesh. The preferred aggregates employed for precision casting applications are fused quartz, zircon sands, magnesium silicate sands such as olivine, and alumino-silicate sands.

Shapes for precision casting differ from ordinary sand type foundry shapes in that the aggregate in shapes for precision casting can be more densely packed than the aggregate in shapes for ordinary sand type foundry shapes. Therefore, shapes for precision casting must be heated before being utilized to drive off volatilizable material present in the molding composition. If the volatiles are not removed from a precision casting shape before use, vapor created during casting will diffuse into the molten metal since the shape has a relatively low porosity. The vapor diffusion would decrease the smoothness of the surface of the precision cast article.

When preparing a refractory such as a ceramic, the predominant portion and at least 80 weight percent of the aggregate employed has an average particle size under 200 mesh and preferably no larger than 325 mesh. Preferably at least about 90% by weight of the aggregate for a refractory has an average particle size under 200 mesh and preferably no larger than 325 mesh. The aggregate employed in the preparation of refractories must be capable of withstanding the curing temperatures such as above about 1500° F. which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon silicon carbide, titanium nitride, boron nitride, molybdenum disilicide, and carbonaceous material such as graphite. Mixtures of the aggregates can also be used, when desired, including mixtures of metals and the ceramics.

Examples of some abrasive grains for preparing abrasive articles include aluminum oxide, silicon carbide, boron carbide, corundum, garnet, emery and mixtures thereof. The grit size is of the usual grades as graded by the United States Bureau of Standards. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers have average particle size no greater than 200 mesh. It is most preferred that at least about 95% of the inorganic filler has an average particle size no greater than 200 mesh. Some inorganic filler include cryolite, fluorospar, silica and the like. When an inorganic filler is employed along with the abrasive grit, it is generally present in amounts from about 1 to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate. Such moisture present on the aggregate can be compensated for, by altering the quantity of water added to the composition along with the other components such as the boronated aluminum phosphate, and alkaline earth metal material.

In molding compositions, the aggregate constitutes the major constituent and the binder constitutes a relatively minor amount. In ordinary sand type foundry applications, the amount of binder is generally no greater than about 10% by weight and frequently within the range of about 0.5 to about 7% by weight, based upon the weight of the aggregate. Most often, the binder content ranges from about 1 to about 5% by weight based upon the weight of the aggregate in ordinary sand type foundry shapes.

In molds and cores for precision casting applications, the amount of binder is generally no greater than about 40% by weight and frequently within the range of about 5 to about b 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

If the binder composition of this invention is to be used in the form of an aqueous solution of boronated aluminum phosphate without the inclusion of other materials such as the alkaline earth metal component, then it can be made available as a one-package system. If, however, an alkaline earth metal component is to be included then the binder composition should be made available as a two-package system. In this situation, when the binder compositions are to be employed along with an aggregate, the contents of the package containing the alkaline earth metal component are usually admixed with the aggregate and then the contents of the boronated aluminum phosphate-containing package are admixed with the aggregate and alkaline earth metal component composition. After either adding the one-package or two-package system to the aggregate and a uniform distribution of the binder system on the particles of aggregate has been obtained, the resulting mix is molded into the desired shape. Methods of distributing the binder on the aggregate particles are well known to those skilled in the art. The mix can, optionally, contain ingredients such as iron oxide, ground flax fibers, wood cereals, clay, pitch, refractory flours and the like.

In addition, the binder systems of the present invention make possible the achievement of molding shapes which posses improved collaspibility and shake out of the shape when used for the casting of the relatively high melting point ferrous-type metals such as iron and steel which are poured at about 2500° F. as compared to other inorganic binder systems such as the silicates. Furthermore, the binder systems of the present invention make possible the preparation of molding shapes which can be employed for the casting of the relatively low melting point non-ferrous type metals such as aluminum, copper, and copper alloys including brass.

In the past, the relatively low melting point of non-ferrous type metals has not been high enough to degrade the bonding characteristics of the binder system sufficiently to provide the degree of collaspibility necessary for shake out by simple mechanical forces available in a commercial application. However, the binder systems of the present invention make it possible to provide molding shapes which can be collasped and shaken out from castings of the relatively low melting point non-ferrous type metals and particularly aluminum without the need of water leaching.

The binder systems of the present invention are cured rapidly by contacting them with ammonia or an amine. The binder, after being mixed with sand grains or abrasive particles and being molded into the desired core or shape, is cured rapidly by contacting with ammonia or an amine. The molded mixture, made up of binder and sand, abrasive grains, etc., will have sufficient permeability to allow the flow of a gas through it. Preferably, ammonia gas in undiluted form is flowed through the molded mixture followed by air purge, the flow of a purging gas such as air or other non-reactive gas. The use of a purge gas, such as air, not only enhances the core by removing the noxious fumes of any residual ammonia or amine, but also further conditions the core by removing a portion of the water present therein. Normally gaseous amines such as the primary, secondary and tertiary methyl and ethyl amines can be used but are preferred less than ammonia. Heating the curing gas (ammonia or amine) will effect a faster reaction of it with the aluminum phosphate binder. Heating the purge gas is also beneficial.

The stability of the moulded cores can be further enhanced by a postbaking operation wherein the cores are heated to a temperature of about 50 to about 200° C. Baking can be done by any number of techniques including oven baking, microwave or radio frequency heating. Core washes such as that described in U.S. Pat. No. 4,001,468 can be applied to the finished cores. The binder compositions of the present invention require exceedingly short curing times to achieve acceptable tensile strengths, an attribute of extreme commercial importance. Optium curing times are readily established experimentally.

When the compositions of the present invention are used to prepare ordinary sand type foundry shapes, the following steps are employed:

(1) forming a foundry mix containing an aggregate (e.g., sand) and the contents of the curable binder system;
(2) shaping the foundry mix in a mold or pattern, and
(3) contacting the shaped foundry mix with ammonia or an amine until the binder has cured.

Ordinarily, purging with air or other non-reactive gas to remove excess curing gas (ammonia or amine) is a desired fourth step.

In order to further understand the present invention the following non-limiting examples concerned with foundry shapes are provided. All parts are by weight unless the contrary is stated. In all the examples, the foundry samples are cured by cold box techniques at room temperature unless the contrary is stated.

EXAMPLE 1

A boronated aluminum phosphate binder composition was prepared as disclosed in U.S. Pat. No. 3,923,525 by reacting an aqueous solution of phosphoric acid, boric acid and hydrated alumina. In the resulting binder composition, the ratio of moles of phosphorus to total moles of aluminum and boron was 3 to 1. The moles of boron present was 20 percent of the moles of aluminum. This binder composition, diluted with water to a viscosity of 670 centistokes was then mixed with Port Crescent foundry sand in a ratio of three parts of binder to 100 parts of sand.

The resulting foundry mix was formed by hand ramming into standard AFS tensile strength samples using the standard procedure. The samples were cured by forcing ammonia gas through them under a pressure of 30 psig and a flow rate of 3500 cc per minute. In one set of tests, gasing time ranged from 15 to 60 seconds and was followed by an air purge of from 15 to 60 seconds. Test results are shown in the following table.

TABLE I

| | | | | |
|---|---|---|---|---|
| Gas* Pressure, psi | 30 | 30 | 30 | 30 |
| Flow Rate, cc/min. | 3500 | 3500 | 3500 | 3500 |
| Gas Time, Sec. | 15 | 30 | 45 | 60 |
| Air Purge, Sec. | 15 | 30 | 45 | 60 |
| Green Compressive strength, psi*** | | | | |
| Immediate | 0.48 | 0.40 | 0.45 | 0.48 |
| 1 Hour | 0.48 | 0.40 | 0.45 | 0.40 |
| 3 Hour | 0.53 | 0.48 | 0.50 | 0.45 |
| 5 Hour | 0.48 | 0.50 | 0.50 | 0.48 |
| Tensile Strength, psi | | | | |
| Out-of-box | 45 (76)** | 50 (75) | 40 (74) | 55 (65) |
| 1 Hour | 70 (87) | 110 (85) | 80 (85) | 120 (85) |
| 4 Hour | 85 (71) | 110 (83) | 95 (87) | 80 (75) |
| 24 Hour | 65 (74) | 85 (70) | 75 (70) | 75 (74) |
| 15 Min. Bake (350 F.) | 165 (79) | 150 (75) | 145 (82) | 95 (74) |
| 30 Min. Bake (350 F.) | 110 (65) | 190 (75) | 80 (65) | 90 (65) |
| Sand: Port Crescent Lake | | | | |
| Resin: 3.0% b.o.s., 670 centistokes | | | | |

TABLE I-continued

Hardener: Anhydrous Ammonia

*ammonia at resin temperature
**scratch hardness determined by Dietert 674 Core Hardness Tester
***indicates stability of uncured samples as a function of time

EXAMPLE 2

In a second series of tests, test samples were prepared as described in Example 1 except that the binder was further diluted with water and each sample gased for 30 seconds. Test results were as shown in Table II.

TABLE III

| Binder Composition moles of boron per 100 moles aluminum | 5 | 5 | 5 | 5 | 5 | 10 | 10 | 10 |
|---|---|---|---|---|---|---|---|---|
| Parts by weight of boronated aluminum phosphate and water per 100 parts of foundry sand | 3 | 3 | 3 | 3 | 3 | 3 | 3 | 3 |
| Ratio by weight of boronated aluminum phosphate to water | 95/5 | 90/10 | 80/20 | 75/25 | 50/50 | 95/5 | 90/10 | 80/20 |
| Tensile strengths and scratch resistance | | | | | | | | |
| out of box | 158 (80) | 175 (66) | 160 (71) | 105 (56) | 65 (41) | 192 (71) | 187 (72) | 140 (65) |
| After baking | | | | | | | | |
| 15 minutes at 350° F. | 223 (82) | 221 (76) | 200 (58) | 183 (37) | 63 (14) | 282 (78) | 233 (66) | 250 (67) |
| 30 minutes at 350° F. | 193 (75) | 205 (63) | 213 (61) | 158 (31) | 42 (11) | 248 (80) | 155 (50) | 112 (41) |
| 45 minutes at 350° F. | 140 (33) | 122 (40) | 108 (39) | 93 (31) | 38 (8) | 128 (52) | 138 (45) | 78 (34) |
| After baking for 30 minutes and exposure to 90% relative humidity for 2 hours | 63 (40) | 62 (37) | 58 (27) | 72 (14) | 43 (8) | 72 (51) | 57 (30) | 70 (13) | were baked for varied periods of time at 350° F. Tensile strengths and scratch resistances are tabulated in Table III.

TABLE II

| | | | | | |
|---|---|---|---|---|---|
| X% Water, b.o.r. | 5 | 10 | 20 | 25 | 30 |
| Gas* Pressure, psi | 30 | 30 | 30 | 30 | 30 |
| Flow Rate, c.c./min. | 3500 | 3500 | 3500 | 3500 | 3500 |
| Gas Time, Sec. | 30 | 30 | 30 | 30 | 30 |
| Air Purge, Sec. | 20 | 20 | 20 | 20 | 20 |
| Green Compressive strength, psi*** | | | | | |
| Immediate | 0.54 | 0.39 | 0.44 | 0.33 | 0.45 |
| 1 Hour | 0.40 | 0.42 | 0.35 | 0.30 | 0.45 |
| 3 Hour | 0.34 | 0.40 | 0.45 | 0.38 | 0.40 |
| Tensile Strength, psi | | | | | |
| Out-of-box | 25 (64)** | 30 (55) | 20 (40) | 15 (30) | — |
| 1 Hour | 90 (60) | 50 (74) | 35 (70) | 25 (67) | 15 (62) |
| 4 Hour | 115 (83) | 60 (81) | 35 (74) | 20 (75) | 25 (71) |
| 24 Hour | 20 (71) | 10 (61) | 20 (72) | 20 (70) | 20 (71) |
| 15 Min. Bake (350 F.) | 205 (64) | 190 (77) | 25 (60) | 30 (63) | 35 (50) |
| 30 Min. Bake (350 F.) | 120 (78) | 110 (76) | 20 (50) | 10 (45) | 10 (50) |

Sand: Port Crescent Lake
Resin: 3.0% INOSET R-1, b.o.s.
Additive: X% Water, b.o.r.
Hardener: Anhydrous Ammonia

*anhydrous ammonia
**scratch hardness determined by Dietert 674 Core Hardness Tester
***indicates stability of uncured samples as a function of time

EXAMPLE 3

Two boronated aluminum phosphate compositions were prepared in a manner similar to Example 1. The moles of boron present in one composition was 5 percent of the moles of aluminum and in the other, 10 percent. The binder compositions were diluted with water in the ratios shown in Table 3 and mixed with foundry sand in a ratio of 3 parts of binder and water per 100 parts of sand. The mix was then formed into standare AFS tensile strength samples and cured with ammonia gas. As in Example 1, some of the test samples

EXAMPLE 4

This example issustrates the use of various additive materials in combination with the binder compositions of this invention, namely metal phosphates, alkaline earth metal compounds and polyhydric alcohols.

Boronated aluminum phosphate compositions similar to those of Example I were prepared. The compositions were diluted with an aqueous (85 percent) solution of phosphoric acid. To these compositions were added calcium acid phosphate, $Ca(H_2PO_4)_2$, magensium carbonate, magnesium silicate, and sorbitol in the proportions indicated in Table IV. Samples were tested as detailed in Examples 1 and 3 with the following results.

TABLE IV

| Binder composition moles of boron per 100 moles aluminum | 5 | | 10 | 10 | 5 |
|---|---|---|---|---|---|

TABLE IV-continued

| | | | | | | |
|---|---|---|---|---|---|---|
| Parts by weight of boronated aluminum phosphate and water per 100 parts of foundry sand | 3 | | 3 | 3 | | 3 |
| Ratio boronated aluminum phosphate 1 H₃PO₄ by weight | 90/10 | 80/20 | 75/25 | 80/20 | 75/25 | 80/15 |
| Additive material | Ca(H₂PO₄)₂ | | | Mg. SiO₃ | | Sorbitol |
| Parts per 100 parts of foundry sand | 0.3 | 0.3 | 0.3 | 0.3 | 0.3 | 0.5 |
| Tensile strengths and scratch resistance | | | | | | |
| out of box | 145 (43) | 175 (69) | 108 (73) | 96 (64) | 94 (71) | 68 (71) |
| After baking | | | | | | |
| 15 minutes at 350 F. | 167 (57) | 139 (69) | 182 (54) | 277 (67) | 260 (47) | |
| 30 minutes at 350 F. | 213 (45) | 243 (50) | 282 (52) | 137 (56) | 151 (55) | |
| 45 minutes at 350 F. | 180 (61) | 215 (46) | 153 (54) | 87 (53) | 117 (39) | |
| After baking for 30 minutes and exposure to 90% relative humidity for 2 hours | 52 (31) | 15 (16) | 210 (15) | 40 (17) | 40 (36) | |

We claim:

1. A process for the fabrication of foundry shapes which comprises:
   (a) mixing foundry aggregate with a bonding amount of up to about 10% by weight based upon the weight of aggregate of a composition which comprises in admixture;
      (i) boronated hydrogen aluminum phosphate containing a mole ratio of phosphorus to aluminum of about 2:1 to about 5:1 and from about 3 to about 40 mole percent of boron based on the moles of aluminum, and
      (ii) water; wherein the amount of aluminum phosphate is from about 50 to about 95% by weight based upon the total weight of aluminum phosphate and water, the amount of water is from about 5 to about 50% by weight based upon the total weight of aluminum phosphate and water, and the quantity and particle size of said aggregate are such to provide sufficient porosity in the foundry shape to permit escape of volatiles from the shape during casting;
   (b) introducing the foundry mix obtained from step (a) into a pattern;
   (c) flowing a curing gas selected from the group consisting of ammonia and amine gases through said foundry mix for a time at least sufficient for the mix to become self-supporting; and
   (d) thereafter removing the shaped foundry mix of step (c) from the pattern.

2. The process of claim 1 wherein said shaped foundry mix recovered in step (d) is baked.

3. The process of claim 1 wherein said curing gas is ammonia.

4. The process of claim 1 wherein said curing gas is a primary, secondary or tertiary ethyl or methyl amine.

5. The process of claim 1 wherein said step of removing the shaped foundry mix is preceded by flowing a non-reactive purging gas through said foundry mix.

6. The process of claim 5 wherein said non-reactive purging gas is air.

7. The process of claim 5 wherein said non-reactive purging gas is heated air.

8. A process for casting of relatively low melting point non-ferrous type metal which comprises:
   (a) fabricating a shape from a composition which comprises a major amount of aggregate and an effective bonding amount up to about 40% by weight of the aggregate of a binder composition which comprises in admixture;
      (i) boronated hydrogen aluminum phosphate containing a mole ratio of phosphorus to aluminum of about 2:1 to about 5:1 and from about 3 to about 40 mole percent of boron based on the moles of aluminum,
      (ii) water; and
      (iii) curing agent comprising ammonia or an amine, wherein the amount of aluminum phosphate is from about 50 to about 95% by weight based upon the total weight of aluminum phosphate and water, and the amount of water is from about 5 to about 50% by weight based upon the total weight of aluminum phosphate and water;
   (b) pouring said relatively low melting point non-ferrous type metal while in the liquid state into or around said shape;
   (c) allowing said non-ferrous type metal to cool and solidify; and
   (d) then separating the molded article.

9. A process for casting of ferrous-type metal which comprises:
   (a) fabricating a shape from a composition which comprises a major amount of aggregate and an effective bonding amount up to about 40% by weight of the aggregate of a binder composition which comprises in admixture:
      (i) boronated hydrogen aluminum phosphate containing a mole ratio of phosphorus to aluminum of about 2:1 to about 5:1 and from about 3 to about 40 mole percent of boron based on the moles of aluminum,
      (ii) water; and
      (iii) curing agent comprising ammonia or an amine, wherein the amount of aluminum phosphate is from about 50 to about 95% by weight based upon the total weight of aluminum phosphate and water, and the amount of water is from about 5 to about 50% by weight based upon the total weight of aluminum phosphate and water.
   (b) pouring said ferrous-type metal while in the liquid state into said shape;
   (c) allowing said ferrous-type metal to cool and solidify; and
   (d) then separating the molded article.

10. In the die casting process the improvement which comprises:
    (a) fabricating a core from a composition which comprises a major amount of aggregate and an effective bonding amount up to about 40% by weight of the aggregate of a binder composition which comprises in admixture:
       (i) boronated hydrogen aluminum phosphate containing a mole ratio of phosphorus to aluminum of about 2:1 to about 5:1 and from about 3 to about 40 mole percent of boron based on the moles of aluminum;
(ii) water; and
(iii) curing agent comprising ammonia or an amine, wherein the amount of aluminum phosphate is from about 50 to about 95% by weight based upon the total weight of aluminum phosphate and water, and the amount of water is from about 5 to about 50% by weight based upon the total weight of aluminum phosphate and water.
(b) positioning said core in a die;
(c) injecting a molten die-casting metal into said die and around said core;
(d) allowing said die-casting metal to cool and solidify; and
(e) then separating a molded article.

11. Binder composition which comprises in admixture;
(a) boronated hydrogen aluminum phosphate containing a mole ratio of phosphorus to aluminum of about 2:1 to about 5:1 and from about 3 to about 40 mole percent of boron based on the moles of aluminum,
(b) water; and
(c) curing agent comprising ammonia or an amine, wherein the amount of aluminum phosphate is from about 50 to about 95% by weight based upon the total weight of aluminum phosphate and water, and the amount of water is from about 5 to about 50% by weight based upon the total weight of aluminum phosphate and water.

12. The binder composition of claim 1 wherein said boronated hydrogen aluminum phosphate contains boron in an amount from about 5 to about 30 mole percent based upon the moles of aluminum.

13. The binder composition of claim 1 wherein said boronated hydrogen aluminum phosphate contains boron in an amount from about 10 to about 25 mole percent based upon the moles of aluminum.

14. The binder composition of claim 1 wherein said boronated hydrogen aluminum phosphate contains a mole ratio of phosphorus to total moles of aluminum and boron of from about 2.5:1 to about 3.5:1.

15. The binder composition of claim 1 wherein said boronated hydrogen aluminum phosphate contains a mole ratio of phosphorous to total moles of aluminum and boron of from about 2.8:1 to about 3.2:1.

16. The binder composition of claim 1 wherein said boronated hydrogen aluminum phosphate contains boron in an amount between about 10 and about 25 mole percent based upon the moles of aluminum, and wherein the mole ratio of phosphorus to total moles of aluminum and boron is between about 2.8:1 to about 3.2:1.

17. The binder composition of claim 1 which further includes an alkaline earth material containing an alkaline earth metal in the form of its simple or compound oxide or hydroxide in an amount up to about 30 parts by weight per 100 parts of boronated hydrogen aluminum phosphate.

18. The binder composition of claim 7 wherein said alkaline earth metal material is selected from the group consisting of calcium oxide, magnesium oxide, calcium silicate, calcium aluminate, calcium aluminum silicate, magnesium silicate and magnesium aluminates.

19. The binder composition of claim 1 comprising, in addition, solid polyhydric alcohol soluble in aqueous solutions of the aluminum phosphate and containing at least 2 adjacent carbon atoms each having directly attached thereto one hydroxyl group; and keto tautomers thereof, wherein the amount of boronated hydrogen aluminum phosphate is from about 50 to about 95% by weight based upon the total weight of aluminum phosphate and water and the amount of water is from about 15 to about 50% by weight based upon the total weight of aluminum phosphate and water; and the amount of said alcohol is from about 0.5 to about 25% by weight based upon the total weight of aluminum phosphate and alcohol.

20. The composition of claim 19 wherein said polyhydric alcohol is sorbitol.

21. The binder composition of claim 11 comprising, in addition, solid organic carboxylic acid soluble in aqueous solutions of the boronated hydrogen aluminum phosphate and containing at least two substituents selected from the group consisting of at least two carboxylic acid groups; and at least one hydroxyl group, or keto tautomers thereof, wherein the amount of boronated aluminum phosphate is from about 50 to about 5% by weight based upon the total weight of aluminum phosphate and water; and the amount of water is from about 15 to about 50% by weight based upon the total weight of aluminum phosphate and water; and the amount of said acid is from about 0.5 to about 25% by weight based upon the total weight of aluminum phosphate, and acid.

22. The binder composition of claim 1 which further comprises a metal phosphate.

23. The binder composition of claim 22 wherein said metal phosphate is a phosphate of a metal selected from the group consisting of iron, chromium and magnesium.

24. Molding composition which comprises:
(a) a major amount of aggregate; and
(b) an effective bonding amount up to about 40% by weight of the aggregate of the binder composition of claim 1.

25. The composition of claim 24 wherein the boronated hydrogen aluminum phosphate contains boron in an amount from about 10 to about 25 mole percent based upon the moles of aluminum.

26. The composition of claim 24 wherein the boronated hydorgen aluminum phosphate contains a mole ratio of phosphorus to to total moles of aluminum and boron of from about 2.5:1 to about 3.5:1.

27. The composition of claim 24 wherein the boronated hydrogen aluminum phosphate contains boron in an amount between about 10 and about 25 mole percent based upon the moles of aluminum, and wherein the mole ratio of phosphorus to total moles of aluminum and boron is between about 2.8:1 to about 3.2:1.

28. The binder of claim 24 which further includes an alkaline earth metal material containing an alkaline earth metal and containing an oxide which is capable of reacting with the boronated hydrogen aluminum phosphate in an amount up to about 30 parts by weight per 100 parts of boronated aluminum phosphate.

29. The composition of claim 28 wherein said alkaline earth metal material is selected from the group consisting of calcium oxide, magnesium oxide, calcium silicate, calcium aluminate, calcium aluminum silicate, magnesium silicate and magnesium aluminates.

30. The binder of claim 24 comprising, in addition, solid polyhydric alcohol soluble in aqueous solutions of the boronated hydrogen aluminum phosphate and containing at least 2 adjacent carbon atoms each having directly attached thereto one hydroxyl group; and keto tautomers thereof, wherein the amount of boronated hydrogen aluminum phosphate is from about 50 to about 95% by weight based upon the total weight of boronated hydrogen aluminum phosphate and water and the amount of water is from about 15 to about 50% by weight based upon the total weight of boronated hydrogen aluminum phosphate and water; and the amount of said alcohol is from about 0.5 to about 25% by weight based upon the total weight of boronated hydrogen aluminum phosphate and alcohol.

31. The composition of claim 30 wherein said polyhydric alcohol is sorbitol.

32. The binder of claim 24 comprising, in addition, solid organic carboxylic acid soluble in aqueous solutions of the boronated hydrogen aluminum phosphate and containing at least two substituents selected from the group consisting of at least two carboxylic acid groups; and at least one hydroxyl group, or keto tautomers thereof, wherein the amount of boronated hydrogen aluminum phosphate is from about 50 to about 95% by weight based upon the total weight of boronated hydrogen aluminum phosphate; the amount of water is from about 15 to about 50% by weight based upon the total weight of aluminum phosphate and water; and the amount of said acid is from about 0.5 to about 25% by weight based upon the total weight of boronated hydrogen aluminum phosphate, and acid.

33. The composition of claim 24 which further comprises a metal phosphate.

34. The composition of claim 33 wherein said metal phosphate is a phosphate of a metal selected from the group consisting of iron, chromium and magnesium.

* * * * *

UNITED STATES PATENT OFFICE
CERTIFICATE OF CORRECTION

Patent No. 4,127,157            Dated November 28, 1978

Inventor(s) John J. Gardikes et al.

It is certified that error appears in the above-identified patent and that said Letters Patent are hereby corrected as shown below:

In column 5, line 61,62 delete "silicon silicon" and substitute therefor---silicon---so that lines 61,62 reads "---silica, silicon carbide---"

Signed and Sealed this

Twentieth Day of May 1980

[SEAL]

Attest:

SIDNEY A. DIAMOND

Attesting Officer      Commissioner of Patents and Trademarks

UNITED STATES PATENT AND TRADEMARK OFFICE
CERTIFICATE OF CORRECTION

PATENT NO. : 4,127,157
DATED : November 28, 1978
INVENTOR(S) : John J. Gardikes et al It is certified that error appears in the above—identified patent and that said Letters Patent is hereby corrected as shown below:

In the Specification:

Column 1, line 31, change "foudnry" to --foundry--.

Column 1, line 35, change "discribed" to --described--.

In the Claims:

Claims 12, 13, 14, 15, 16, 17, 19 and 22, line 1
    of each, change the dependency from "1" to --11--.

Claim 18, line 1, change the dependency from "7"
    to --17--.

Claim 26, line 2, change "hydorgen" to --hydrogen--;
    and line 3, delete "to" (second occurrence).

Signed and Sealed this

Twenty-fourth Day of June 1980

[SEAL]

Attest:

SIDNEY A. DIAMOND

Attesting Officer   Commissioner of Patents and Trademarks